UNITED STATES PATENT OFFICE.

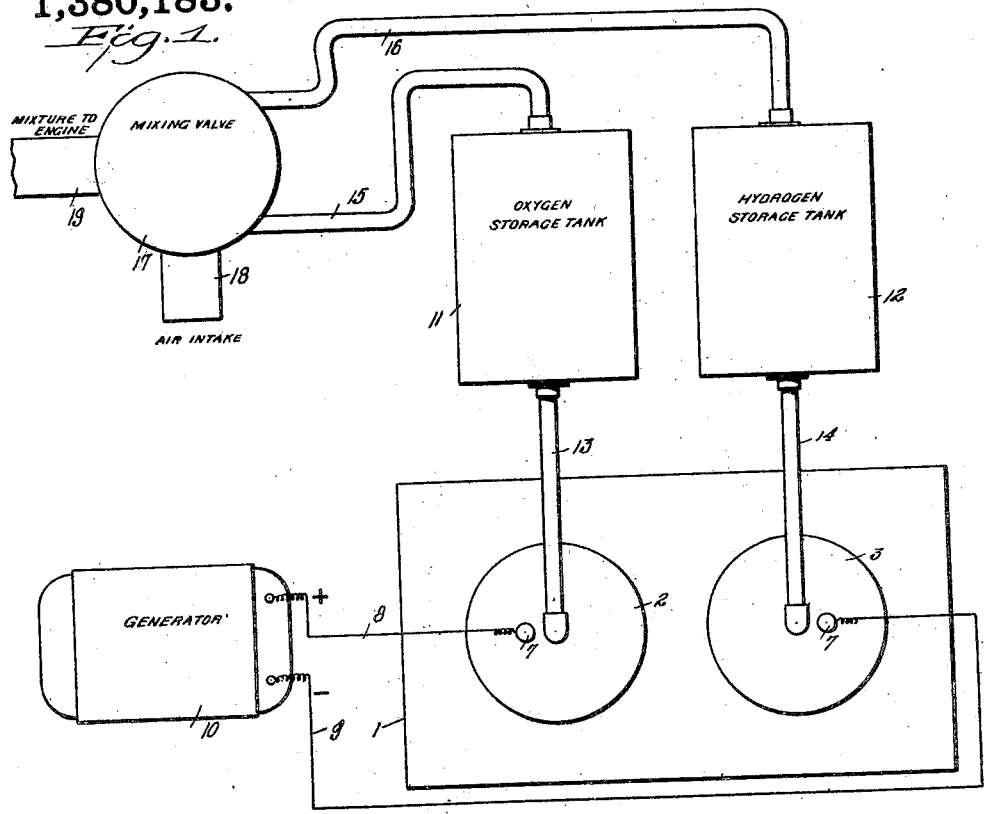
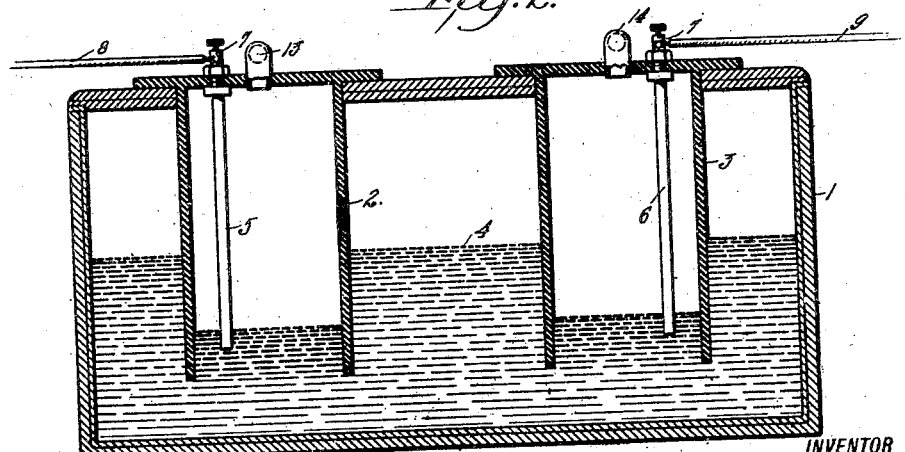

MARTIN BOISEN, OF SANDUSKY, OHIO.

GAS-GENERATOR.

1,380,183. Specification of Letters Patent. Patented May 31, 1921.

Application filed July 6, 1920. Serial No. 394,168.

*To all whom it may concern:*

Be it known that I, MARTIN BOISEN, a citizen of the United States, and a resident of Sandusky, in the county of Erie and State of Ohio, have invented a new and Improved Gas-Generator, of which the following is a full, clear, and exact description.

This invention relates to improvements in gas generators, an object of the invention being to provide an improved apparatus for decomposing water so as to generate oxygen and hydrogen and direct these gases into separate tanks, and afterward commingled in the desired proportions for use, the use being primarily intended for internal combustion engines.

A further object is to provide an economical process for decomposing water, either pure, adulterated or contaminated, by artificial or natural means, so that oxygen and hydrogen are taken off from the same, the decomposing tank and the operation of the generator being automatic, the pressure in the tanks controlling the level of water so as to stop and start decomposing automatically.

With these and other objects in view the invention consists in certain novel features of construction, and combinations and arrangements of parts as will be more fully hereinafter described and pointed out in the claims.

In the accompanying drawings—

Figure 1 is a diagrammatic view illustrating my invention.

Fig. 2 is a view in vertical longitudinal section through the decomposing tank.

1 represents my improved decomposing tank, in the top of which is supported a pair of tubular cells 2 and 3. These cells 2 and 3 are preferably of non-electricity conducting material having closed upper ends and open lower ends, the open lower ends being projected below the water level 4 in the tank 1 as it is to be understood that water is to be supplied to the tank 1 as it may be used.

In the cell 2 I provide an anode 5 and in the cell 3 a cathode 6. The cathode and the anode terminate slightly above the lower ends of their cells and at their upper ends are provided with binding posts 7 which are connected by wires 8 and 9 respectively with an electric generator 10.

11 and 12 represent oxygen and hydrogen storage tanks, the former being connected by a pipe 13 with the top of cell 2 and the latter connected by a pipe 14 with the top of cell 3. Outlet pipes 15 and 16 connect the tanks 11 and 12 respectively with a mixing valve 17 having an air intake 18 and having an outlet 19 for conveying the mixed gas to an engine or other port of use.

When the electric current is closed, a circuit is made from the anode 5 through the water 4 to the cathode 6, causing a decomposition of the water in the cells 2 and 3 and forming in the cell 2 oxygen and in the cell 3 hydrogen, the pipes 13 and 14 carrying these gases to the storage tanks 11 and 12. When the pressure in the tanks or in the pipes 13 and 14 becomes excessive, it will force the water downwardly in the cells 2 and 3 below the lower ends of the anode and cathode and thus open the electric circuit and cause a cessation of the operation. When the pressure decreases, the water will rise in the cells and the circuit will be again closed so that the operation will be continued.

It will thus be noted that by this simple form of apparatus a uniform pressure is maintained in the tanks and the circuit is opened and closed by the control of the level of water due to the pressure of the gases.

As above stated, it is the purpose of my invention to utilize these gases primarily for the operation of internal combustion engines, but I desire to cover broadly my improved apparatus for any use to which it can be put.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. An apparatus of the character described, comprising a decomposing tank containing water; a pair of tubular cells located in the tank having open lower ends submerged in the water, an anode in one cell having its lower end normally submerged in the water in the cell, a cathode in the other cell having its lower end normally submerged in the water in the cell, said anode and said cathode terminating at their lower ends in a plane above the lower ends of the cells in which they are located, oxygen and hydrogen tanks communicating respectively with the upper portions of said cells, and a source of electricity included in circuit with said anode and cathode.

2. An apparatus of the character described, comprising a water containing tank having openings in its top, a pair of hollow cells of non-conducting material located in said openings, said cells having closed upper ends and open lower ends, the latter submerged in the water in the tank, an anode in one cell, a cathode in the other cell, said anode and cathode normally submerged at their lower ends in the water in the cells, said anode and said cathode terminating at their lower ends in a plane above the lower ends of the cells in which they are located, an electric generator connected to said anode and cathode, a pair of tanks, pipes connecting the tanks with the cells, a mixing valve, and outlet pipes from the tanks to the mixing valve.

MARTIN BOISEN.